United States Patent
Zamyatin et al.

(10) Patent No.: US 8,023,713 B2
(45) Date of Patent: Sep. 20, 2011

(54) METHOD AND SYSTEM FOR REDUCING ARTIFACT DUE TO TIME DELAY IN DATA ACQUISITION SYSTEM IN COMPUTER TOMOGRAPHY

(75) Inventors: Alexander Zamyatin, Buffalo Grove, IL (US); Ilmar A. Hein, Chicago, IL (US)

(73) Assignees: Kabushiki Kaisha Toshiba, Tokyo (JP); Toshiba Medical Systems Corporation, Otawara-Shi, Tochigi-Ken (JP)

( * ) Notice: Subject to any disclaimer, the term of this patent is extended or adjusted under 35 U.S.C. 154(b) by 60 days.

(21) Appl. No.: 12/690,206

(22) Filed: Jan. 20, 2010

(65) Prior Publication Data

US 2011/0176745 A1    Jul. 21, 2011

(51) Int. Cl.
*G06K 9/00* (2006.01)
(52) U.S. Cl. ........ 382/131; 382/275; 382/289; 382/309; 250/363.07; 378/4; 600/407
(58) Field of Classification Search .......... 382/128–132, 382/275, 289, 309; 250/363.01–363.1; 378/4; 600/407
See application file for complete search history.

(56) References Cited

U.S. PATENT DOCUMENTS

| | | | | |
|---|---|---|---|---|
| 4,075,883 | A * | 2/1978 | Glover | 73/607 |
| 5,097,492 | A * | 3/1992 | Baker et al. | 378/22 |
| 5,175,754 | A * | 12/1992 | Casey et al. | 378/4 |
| 5,265,013 | A * | 11/1993 | King et al. | 378/4 |
| 5,646,962 | A * | 7/1997 | Harrison | 375/308 |
| 7,317,189 | B2 * | 1/2008 | Miyazaki et al. | 250/370.09 |
| 7,483,235 | B2 * | 1/2009 | Kawabe | 360/77.08 |
| 2004/0066880 | A1 * | 4/2004 | Oikawa | 378/4 |
| 2007/0299301 | A1 * | 12/2007 | Uchiyama et al. | 600/101 |
| 2010/0296623 | A1 * | 11/2010 | Mielekamp et al. | 378/4 |

* cited by examiner

*Primary Examiner* — Aaron Carter
(74) *Attorney, Agent, or Firm* — Knoble Yoshida & Dunleavy, LLC

(57) ABSTRACT

The CT imaging system optimizes its image generation by substantially reducing artifacts caused by a known amount of readout time lag in the X-ray detectors or data acquisition system. Although each detector row takes the same amount of time to read out the signals, the time lag cumulates over the rows as each row is sequentially read out. The back-projection coordinates are correspondingly corrected based upon the above described delay.

14 Claims, 5 Drawing Sheets

A. KVD-1PI
DAS TIME LAG = 0μs

B. KVD-1PI
DAS TIME LAG = 6μs
NO CORRECTION

B. KVD-1PI
DAS TIME LAG = 6μs
SIMPLE DAS CORRECTION

FIG. 6A          FIG. 6B

REAL DATA

A. KVD-1PI          B. KVD-1PI
NO DAS CORRECTION     DAS CORRECTION

METHOD AND SYSTEM FOR REDUCING ARTIFACT DUE TO TIME DELAY IN DATA ACQUISITION SYSTEM IN COMPUTER TOMOGRAPHY

FIELD OF THE INVENTION

The current invention is generally related to an image processing and system, and more particularly related to improve image generation by reducing certain artifact caused by a time lag in the data acquisition system (DAS) during a data acquisition process.

BACKGROUND OF THE INVENTION

In CT scanner systems, X-ray detectors have changed over decades. For the purpose of acquiring two dimensional projection data, the detectors are arranged in two dimensions that include rows and columns. In general, each of the rows is sequentially read to detect X-ray, and each sequential reading takes a known amount of time that becomes a delay or a lag. Despite the sequential reading, since the X-ray detector has increased a number of rows to cover a wider scanning area, the time delay has accumulated over the rows to become some concern.

In particular, to scan a wider area of a subject, a number of rows of the detectors has dramatically increased from 16 to 320 over years. For example, Toshiba Aquilion ONE™ currently is equipped with 320 rows of the detectors and covers 160 mm of the subject area as the detector set completes one rotation around the subject in 0.35 second. While the number of the detector rows has increased, the rotational speed of the gantry has also improved. Both the expanded rows of the detector and the high rotating speed require the detectors to improve their detection efficiency.

As a number of rows of the detectors increases, the detection speed becomes a significant factor as the detectors are rotating at a high speed. This is because the detectors must detect their inputs with the least amount of time delay so that projection data contains substantially minimal error due to a detection delay. Ultimately, an image should be reconstructed from the above described projection data. Since the detection delay in the data acquisition system (DAS) typically ranges from three to six micro seconds for each row of the detectors, if the total number of rows is less than 16 rows, the delay may not cause noticeable artifact in the reconstructed image. On the other hand, the time delay artifact may become noticeable when the number of detector rows is more than a certain number such as 16. For example, in the most extreme case, when 320 rows of detectors are used with a 3 micro-second delay, the detector delay progressively becomes worse as each row outputs its signals and the last row or $320^{th}$ row could have a 920 micro-second delay.

Artifact also becomes a significant issue when the above described detection delay is combined with other factors such as an acquisition method and a reconstruction algorithm. One example of the combination is that the detector delay contributes to the artifact when the reconstruction is performed on helical projection data using a certain algorithm as in the case of "Exact Reconstruction" of Katsevich type. Another example of the combination is that even if a number of the detector rows is relatively small, the artifacts becomes a significant issue for reconstruction under flying focal spot (FFS).

In response to the above described problems, one prior art attempt is to improve the response characteristics of the detectors. Although this approach has been pursued at additional hardware costs, the associated costs may be practically prohibitive. Furthermore, the approach will never be perfect since the detectors are also moving at a high speed during the scan. Thus, it remains desirable to improve the image quality by substantially reducing the artifact due to the DAS lag without using additional hardware solution.

SUMMARY OF THE INVENTION

In order to solve the above and other problems, according to a first aspect of the current invention, a method of improving image generation from projection data of a CT scanner, including the steps of: a) determining the back-projection coordinates from the projection data with a known amount of readout time lag caused by a set of detectors; b) determining correction terms for the back-projection coordinates based upon the known readout time lag and known rotational parameters; c) applying the correction terms to back-projection coordinates so as to output corrected back-projection coordinates; and d) determining a pixel value based upon the projection data with the corrected back-projection coordinates.

According to a second aspect of the current invention, a CT scanner for improving image generation from projection data, including: a gantry rotating around a predetermined axis; a predetermined rows and columns of detectors mounted on the gantry for obtaining projection data with a known amount of readout time lag; and an image processing unit for determining back-projection coordinates from the projection data, the image processing unit determining correction terms for the back-projection coordinates based upon the known readout time lag and known rotational parameters so that the correction terms are applied to the back-projection coordinates to generate output corrected back-projection coordinates, the image processing unit determining a pixel value based on the projection data with the corrected back-projection coordinates.

Those and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
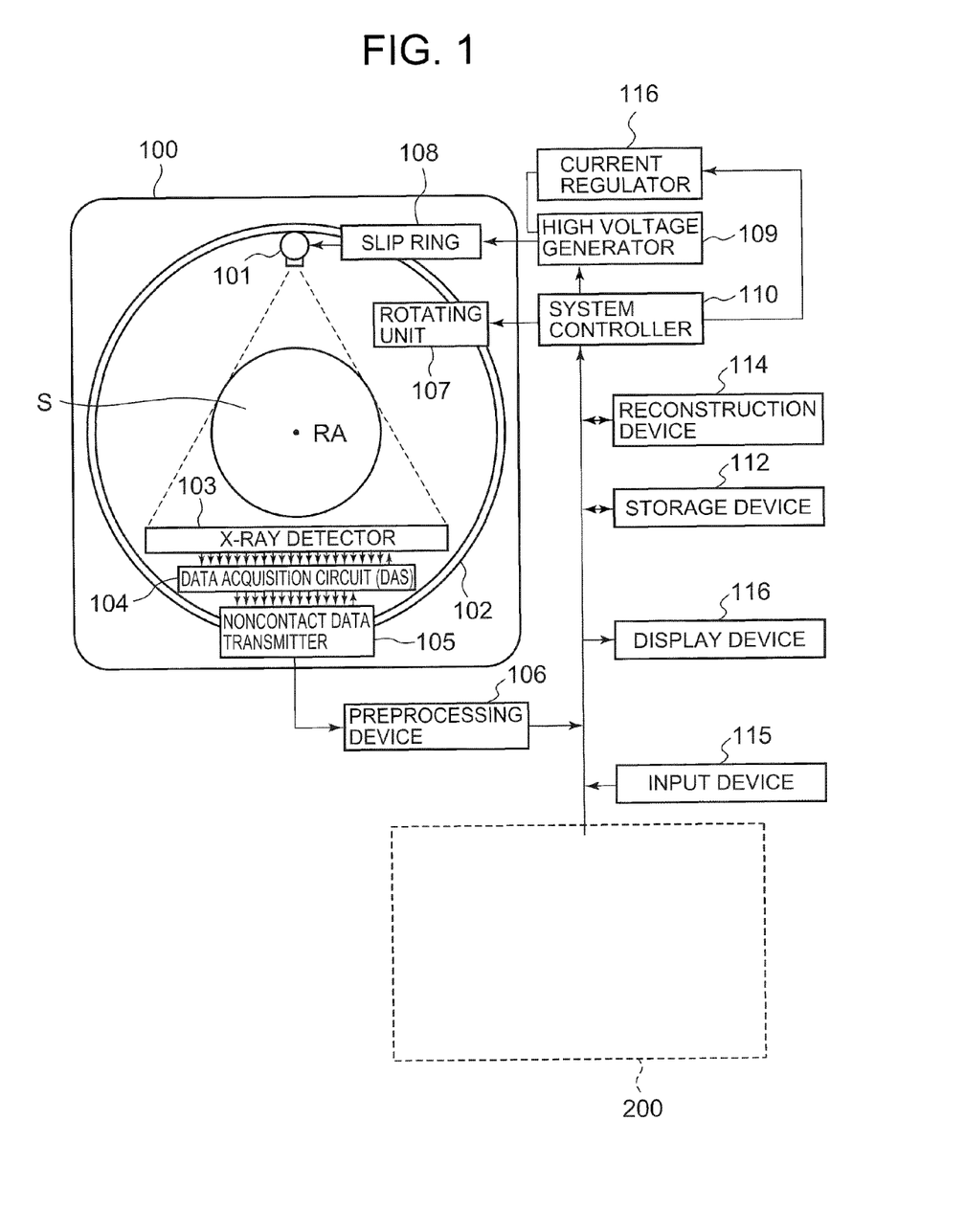
FIG. 1 is a diagram illustrating one embodiment of the multi-slice X-ray CT apparatus or scanner according to the current invention.

Referring now to the drawings, wherein like reference numerals designate corresponding structures throughout the views, and referring in particular to FIG. 1, a diagram illustrates one embodiment of the multi-slice X-ray CT apparatus or scanner according to the current invention including a gantry 100 and other devices or units. The gantry 100 is illustrated from a side view and further includes an X-ray tube 101 and a multi-row or two-dimensional array type X-ray detector unit 103. The X-ray tube 101 and X-ray detector unit 103 are diametrically mounted across a subject S on an annular frame 102, which is rotatably supported around a rotation axis RA. A rotating unit 107 rotates the frame 102 at a high speed such as 0.4 sec/rotation while the subject S is being moved along the axis RA into or out of the illustrated page.

The multi-slice X-ray CT apparatus further includes a high voltage generator 109 that applies a tube voltage to the X-ray tube 101 through a slip ring 108 so that the X-ray tube 101 generates X ray. The X rays are emitted towards a subject whose cross sectional area is represented by a circle. The X-ray detector 103 is located at an opposite side from the X-ray tube 101 across the subject for detecting the emitted X rays that have transmitted through the subject.

The X-ray detector unit 103 further includes a predetermined rows and columns of individual detectors. Each row of detectors is sequentially read out with a known amount of time or lag ranging from three micro-seconds to six micro-seconds. As the detectors are read out with the time delay, since X-ray detector 103 is mounted on the rotating gantry 100, the read out signals are not geometrically in perfect synch with the corresponding detector positions with respect to the subject S and the X-ray source 101. That is, all data is not collected simultaneously from the same geometric point and the same point in time.

For the sake of illustration, a first row and a second row of the detectors are considered for describing the above time delay. While the electrical signals are being read from the first row of the detectors, the detectors are also moving in their position due to the gantry rotation. By the time when a second or adjacent row of detectors generates and outputs its signals, the second detector row has already moved away from the original position when the first row detectors had been read. Thus, the second row detectors actually generate and output the signals that do not precisely correspond to a portion immediately adjacent of the original first-row portion.

Still referring to FIG. 1, the X-ray CT apparatus or scanner further includes other devices for processing the detected signals from X-ray detector unit 103. A data acquisition circuit or a Data Acquisition System (DAS) 104 reads from the X-ray detector unit 103 a signal output for each row at a time with a read out delay of approximately 6 micro seconds between the two rows of the detectors. The DAS 104 converts the output signal for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

The above projection raw data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, display device 116, input device 115, and the scan plan support apparatus 200. The scan plan support apparatus 200 includes a function for supporting an imaging technician to develop a scan plan.

One embodiment of the reconstruction device 114 further includes various software and hardware components. According to one aspect of the current invention, the reconstruction device 114 of the CT apparatus advantageously corrects backprojection coordinates using a predetermined coordinate correction technique so as to substantially reduce the geometrically incorrect position of the read out signals from the detector unit 103. In general, the reconstruction device 114 in one embodiment of the current invention operates on the projection data to correct the geometric discrepancy during the backprojection process.

Figure 2:
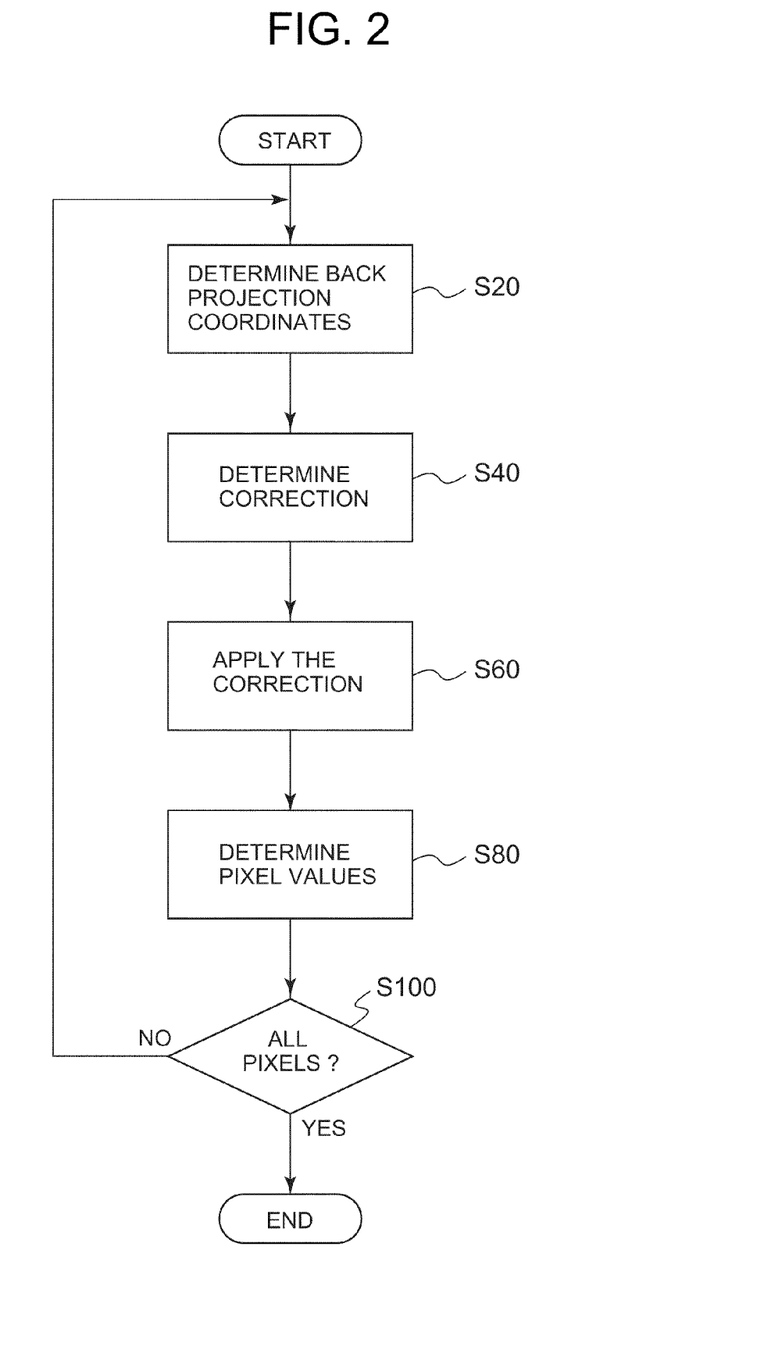
FIG. 2 is a flow chart illustrating one exemplary method of improving image generation from projection data according to the current invention.

Now referring to FIG. 2, a flow chart illustrates a method of improving image generation from projection data in a CT scanner according to the current invention. For the collected projection data, it is assumed that the rotational parameters of the gantry 100 and the detector unit 103 are known. For example, one complete rotation takes 0.5 second while the detector 103 has a DAS time lag of 6 micro seconds per each row. The obtained projection data is organized in segments or detector rows. In a step S20, a routine or device determines backprojection coordinates such as $\gamma(x, \beta)$ and $v(x, \beta)$ during reconstruction. Although the backprojection equations will be described below, a prior art technique is generally used to generate the backprojection coordinates $\gamma(x, \beta)$ and $v(x, \beta)$.

Figure 3A:
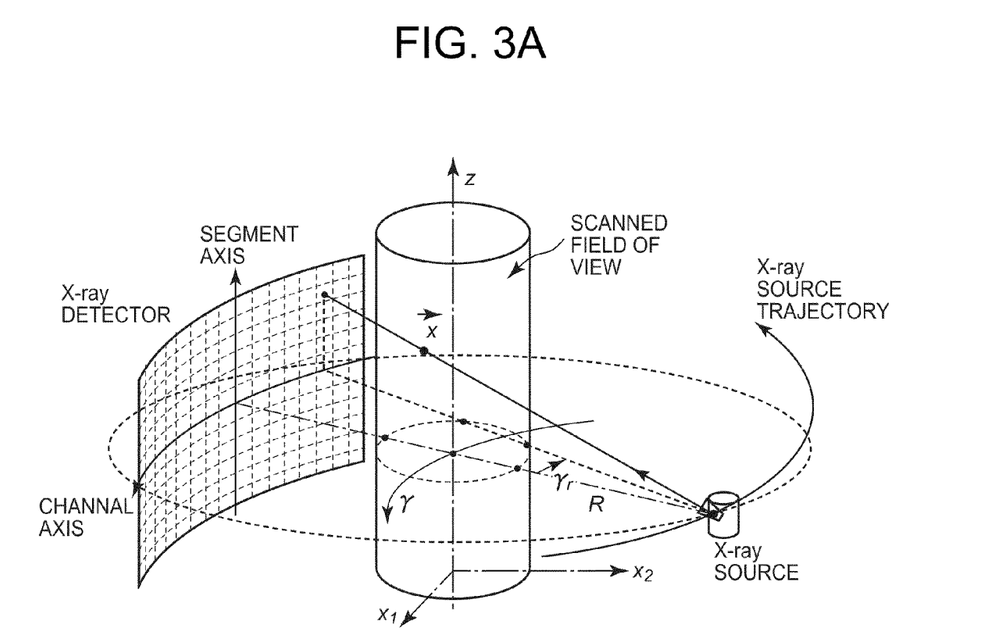
FIG. 3A is a diagram illustrating a backprojection technique.

Referring to FIG. 3A, a diagram illustrates a backprojection technique. The detector unit 103 has a segment axis that is also known as a detector row axis and a channel axis that is also known as a detector column axis. The X-ray source 101 is located across the detector unit 103 with a scanned field view S while the X-ray source 101 and the detector unit 103 rotate along the X-ray source trajectory as indicated by arrows. A line R indicates a distance between the origin in the scanned field of view S and the X-ray source 101 while a line L indicates a distance between the X-ray source 101 and a particular point x of an object in the scanned field of view S. The lines R and L form an angle $\gamma$ at the X-ray source 101.

Figure 3B:
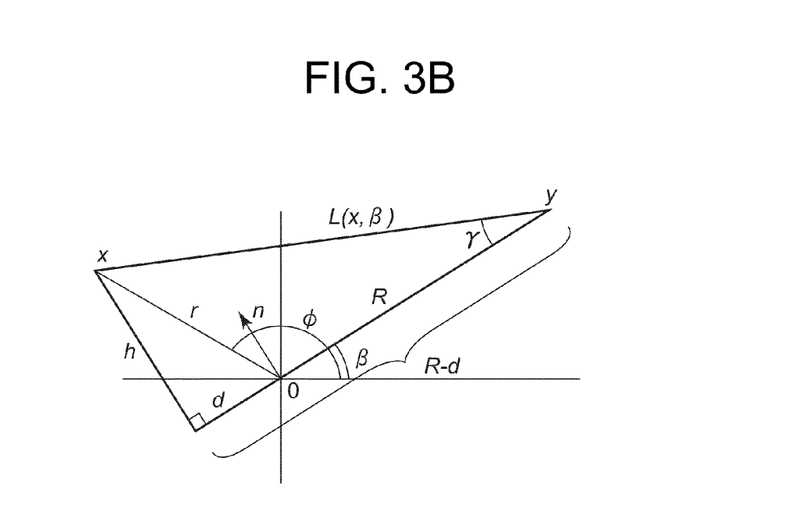
FIG. 3B is a diagram illustrating backprojection coordinates using the backprojection technique of FIG. 3A.

Referring to FIG. 3B, a diagram illustrates certain geometric relationships among the above described elements in FIG. 3A when they are seen from top. A letter y represents a position of the X-ray source 101 while a letter x represents a particular point x in the scanned field of view S. An arrow n is a normal vector and letters h and d refer to a part of a triangle, where $h = x \cdot n$ while $d = x \cdot n_\perp$.

Still referring to FIGS. 3A and 3B, the backprojection coordinate $\gamma(x, \beta)$ is defined in the following equations: Assuming that reconstruction pixel x is expressed by $(x_1, x_2, x_3)$ while cylindrical coordinates of x are expressed by $(r, \phi, z_x)$, where $z_x = x_3$. Detector coordinates are indicated by $(v, \gamma)$, where $v$ is the detector row coordinate and $\gamma$ is the angular detector coordinate. Source trajectory $y = (R \cos \beta, R \sin \beta,$ $H\beta/2\pi$). The normal vector $n=(\sin\beta, -\cos\beta)$, and $n^{TM}=(\cos\beta, \sin\beta)$. The distance L between the source and the pixel is expressed by Equation (1):

$$L(x, \beta) = \sqrt{(x_1 - R\cos\beta)^2 + (x_2 - R\sin\beta)^2} \quad (1)$$

In general, the Backprojection equations for determining the backprojection coordinates are defined by either of Equations (2) and (3) and Equation (5) below.

$$\gamma(x, \beta) = \arcsin\frac{h}{L(x, \beta)} \quad (2)$$

$$\gamma(x, \beta) = \arctan\frac{h}{R - d}, \quad (3)$$

$$L(x, \beta) = \sqrt{(R - d)^2 + h^2} \quad (4)$$

where $h = x \cdot n$, $d = x \cdot n$. Note that $h' = d$, $d' = -h$. Note also that $R - d = L\cos\gamma$.

$$v(x, \beta) = (z_x - z_\beta)\frac{R}{L(x, \beta)}, \quad (5)$$

where $z_x = x_3$ and $z_\beta = H\beta/2\pi$

Figure 4:
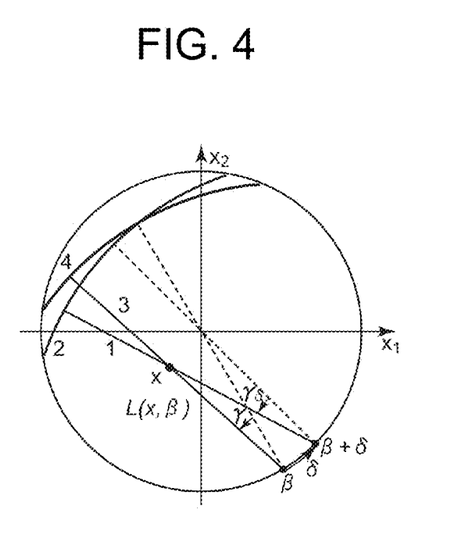
FIG. 4 is a diagram illustrating an error caused by a DAS lag time.

Now referring to FIG. 4, because of the rotation of the gantry 100 and the DAS time lag time, the segment is shifted by some error or difference $\delta$. $\beta$ is an assumed source position while $\beta+\delta$ is a true source position. An assumed ray 3 passes through pixel x and intersects an assumed detector position 4 at view $\beta$. On the other hand, a true ray 1 passes through the same pixel x and intersects a true detector position 2. Furthermore as respectively indicated, an angular coordinate of the assumed ray 3 is $\gamma$ while an angular coordinate of the true ray 1 is $\gamma_\delta$ with respect to a corresponding dotted line. A distance from the assumed source position $\beta$ to the pixel x is indicated by $L(x, \beta)$.

Referring back to FIG. 2, as described above with respect to FIG. 4, because of the rotation of the gantry 100 and the known DAS time lag, the segment is shifted by some error or amount $\delta$, and the shifted amount $\delta$ is generally determined in a step S40 before a particular reconstruction algorithm is applied during reconstruction. The shifted amount $\delta$ is determined as below during backprojection, assuming that each row k ranges from k=0 to k=$N_{row}$−1 and is read with a known delay ks. This means each row k has an additional angular offset s with respect to row k−1, and the backprojection coordinate must be accordingly adjusted. The delay correction term is determined in the step 40 and is approximated by using the first order Taylor series:

$$\gamma_\delta = \gamma(x, \beta+\delta) = \gamma(x, \beta) + \delta\gamma'(x, \beta)$$

$$v_\delta = v(x, \beta+\delta) = v(x, \beta) + \delta v'(x, \beta)$$

Here we compute derivatives $\gamma'(x, \beta)$ and $v'(x, \beta)$ with respect to $\beta$, assuming x constant. The angular shift $\delta$ is determined by:

$$\delta = k\sigma = 2\pi k \frac{DasLagTime}{RotTime} \quad (6)$$

where k is the row number, k=0, . . . , $N_{row}$−1. One exemplary pair of values includes Rotational Time (RotTime) is 0.5 sec and DAS lag time (DasLagTime) is 6 microseconds. We find:

$$\gamma'(x, \beta) = \frac{R\cos\gamma(x, \beta) - L(x, \beta)}{L(x, \beta)}.$$

$$v'(x, \beta) = -R\frac{(z_x - z_\beta)R\sin\gamma(x, \beta) + HL(x, \beta)/2\pi}{L^2(x, \beta)}$$

The following approximate correction is provided by Equations (7) and (8) for the $$\gamma(x, \beta+\delta) = \gamma(x, \beta) + \delta\frac{R\cos\gamma(x, \beta) - L(x, \beta)}{L(x, \beta)}. \quad (7)$$

$$v(x, \beta+\delta) = v(x, \beta) - \delta R\frac{(z_x - z_\beta)R\sin\gamma(x, \beta) + HL(x, \beta)/2\pi}{L^2(x, \beta)}. \quad (8)$$

The above described correction term is applied in a step S60 and the pixel values are determined in a step S80 based upon the corrected coordinates in the above described manner. The above described correction in the steps S20 through S80 is repeated for every pixel. When it is determined in a step S100 that all pixels are not yet corrected, the process resumes to the Step S20. When it is determined in the step S100 that every pixel is corrected, the process terminates.

As mentioned before, the artifact due to the DAS lag is pronounced by the use of certain reconstruction conditions. One such condition includes an application of "Exact Reconstruction" of Katsevich type, which uses PI-window (or Tam-Danielson window) on the detector with sharp boundaries (1 inside, 0 outside). In case of geometric misalignments, the sharp window boundaries generally produce undesirable artifacts. In other words, "Exact Reconstruction" is more sensitive to geometric inaccuracies. Since the DAS introduces geometric inaccuracy, "Exact Reconstruction" is more sensitive to the DAS time lag. On the other hand, since other approximate reconstruction techniques apply data averaging, it is more stable to small misalignments. Yet, these approximate reconstruction techniques may be more susceptible to cone beam artifacts. "Exact Reconstruction" assumes perfect data and uses every measurement only once, without averaging. Therefore, it suffers more from geometric inaccuracies in the x-ray projection data.

In addition, the above undesirable effects may be also pronounced in combination with other factors. During data acquisition, helical movement of the detector may cause more of the above described misalignments. Although circular movement of the detector may cause less of the misalignments in the acquired projection data, a number of detector rows certainly is a major factor in causing the artifacts due to the DAS lag time. For the above reasons, the artifacts due to the DAS lag is most pronounced with the helical projection data with a large number of detector rows such as 320 rows.

Figure 5A:
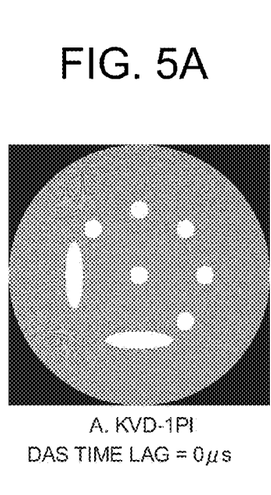
FIG. 5A is an image from the above described simulation data having a DAS time lag of 0 micro second.
Figure 5B:
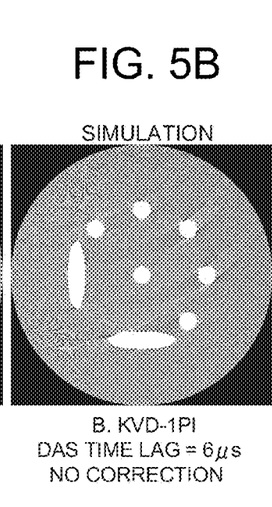
FIG. 5B shows an image from the simulation data having a DAS time lag of 6 microseconds without the above described time-lag correction.
Figure 5C:
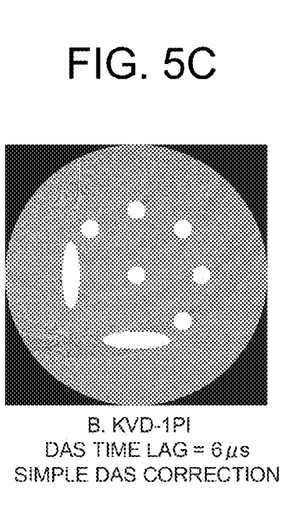
FIG. 5C shows an image from the simulation data having a DAS time lag of 6 microseconds with the above described time-lag correction.

FIGS. 5A, 5B and 5C illustrate results by a time-lag correcting technique using a reconstruction algorithm without involving flying focal spot according to the current invention. In general, time-lag has been simulated with a gantry rotation offset in degrees corresponding to the time delay for each segment column. To test the effect of the time-lag correction, 64 microviews per view have been generated, one view for each segment time delay. A total number of the microviews is 165,184 (2581 views×64 microviews). Based upon the above microviews, time-delay views have been assembled from 64 microviews by extracting the correct segment rows and combining into corresponding single full views with no integration over microviews. A segment-dependent time lag causes a rotational error in the reconstructed images.

For the above described simulation, a microview is defined to be a projection on the detector including all rows at a particular time point. In real system, data is obtained by integration over time as electronics integrates electric charge induced by x-ray photons. In simulation, several micro-views are generated at several consecutive moments and are averaged to obtain a full view. Taking into account DAS time lag, the view is averaged on a segment-by-segment basis, to reproduce the effect of time lag.

Other characteristics of the simulation data include the following parameters.

| | |
|---|---|
| NSeg = | 64 |
| CS = | 26.5 mm/rev |
| mm/rev Pitch = | 53 seg/rev |
| w = | 0.5 mm |
| μCh = | 5 |
| μSeg = | 3 |
| μSrc = | 1 |
| T rotation = | 0.5 s |
| Delay = | 6 μs |
| Rot. Offset = | 0.00432° |
| Max Delay = | 378 μs |
| Max Rot. Offset = | 0.272° |
| VPR = | 900 |
| Total Views = | 2580 |
| Where | |
| NSeg: | a number of segments or detector rows |
| CS: | |
| mm/rev Pitch: | millimeter per revolution in pitch |
| w: | width |
| μCh: | number of micro channels in each detector cell |
| μSeg: | a number of micro segments in each detector cell |
| μSrc: | a number of micro source |
| T rotation: | time for each rotation |
| Delay: | segment delay or DAS lag time per row |
| Rot. Offset: | rotational offset |
| Max Delay: | maximum delay due to DAS lag time |
| Max Rot. Offset: | maximum rotational offset to DAS lag time |
| VPR: | |
| Total Views: | a number of total views |

Now referring to FIGS. 5A, 5B and 5C, the effect of the DAS lag time correction is described using simulated helical projection data. FIG. 5A shows an image from the above described simulation data using a KVD-1P1 (Exact Reconstruction) having a DAS time lag of 0 micro second. The FIG. 5A image is generated by averaging all of the microviews. FIG. 5B shows an image from the simulation data using a KVD-1P1 (Exact Reconstruction) having a DAS time lag of 6 microseconds without the above described time-lag correction. The FIG. 5B image is generated by averaging microviews on a row-by-row basis. For example, if a first row at a current view is obtained by averaging first row data from microviews numbered from 100 through 120, a second row is obtained by averaging second row data from microviews numbered from 101 through 121. By the same token, a third row is obtained by averaging third row data from microviews numbered from 102 through 122. The FIG. 5B image includes some undesirable artifact manifesting as stripes that run across the circular holes. FIG. 5C shows an image from the simulation data using a KVD-1P1 (Exact Reconstruction) having a DAS time lag of 6 microseconds with the above described time-lag correction. As a result of the DAS time lag correction, the undesirable stripes appear less pronounced in the FIG. 5C image.

Figure 6A:
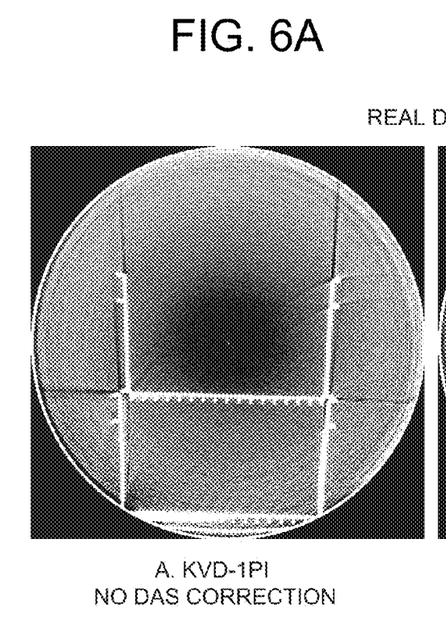
FIG. 6A shows an image from the real data having a DAS time lag of 6 microseconds without the above described time-lag correction.
Figure 6B:
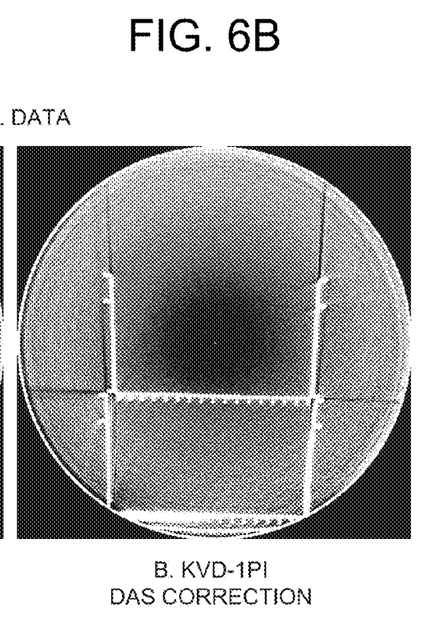
FIG. 6B shows an image from the real data having a DAS time lag of 6 microseconds with the above described time-lag correction.

Now referring to FIGS. 6A and 6B, the effect of the DAS lag time correction is described for real data using a wire held by a frame. FIG. 6A shows an image from the real data using a KVD-1P1 (Exact Reconstruction) having a DAS time lag of 6 microseconds without the above described time-lag correction. The FIG. 6A image includes some undesirable artifact manifesting as streaks or arcs near the frame image. FIG. 6B shows an image from the real data using a KVD-1P1 (Exact Reconstruction) having a DAS time lag of 6 microseconds with the above described time-lag correction. As a result of the DAS time lag correction, the undesirable streaks appear less pronounced in the FIG. 6B image.

In addition to the above correction results, the DAS time lag is corrected in conjunction with flying a focal spot technique. Two flying focal spot techniques have been considered. The weighted zero-interlacing algorithm (ZIw) was developed for z flying focal spot and evaluated with sphere and coin phantoms. This algorithm advantageously works for native cone-beam geometry (data does not have to be rebinned to parallel). On the other hand, the disadvantage includes a tradeoff between image quality and z resolution. At the best image quality weighting, although the windmill artifact is greatly reduced, there is no improvement in z resolution. At best z-resolution weighting, the z resolution is almost twice that for the non-flying focal spot case while the windmill artifact reduction is poorer and some additional artifacts appeared.

The other flying focal spot technique uses the Blanced Flying Focal Spot (BFFS) algorithm that was developed for xy flying focal spot. The advantages are that data is directly interlaced without rebinning and that uniform resolution is obtained across the field of view. The disadvantage is that it works only for a selected number of views per revolution such as 5778, 1926, 1156, 825 for typical Toshiba geometry. For this reason, if a typical view per resolution value is close to the optimal value such as 1800, the xy resolution is less and some moiré artifacts are introduced.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of improving image generation from projection data of a CT scanner, comprising the steps of:
   a) determining the back-projection coordinates from the projection data with a known amount of readout time lag caused by a set of detectors;
   b) determining correction terms for the back-projection coordinates based upon the known readout time lag and known rotational parameters;
   c) applying the correction terms to back-projection coordinates so as to output corrected back-projection coordinates; and
   d) determining a pixel value based upon the projection data with the corrected back-projection coordinates.

2. The method of improving image generation according to claim 1, wherein the back-projection coordinates in said step a) further includes segment back-projection coordinates which correspond to detector rows.

3. The method of improving image generation according to claim 1, wherein the back-projection coordinates in said step a) further includes angular channel back-projection coordinates which correspond to detector columns.

4. The method of improving image generation according to claim 1, wherein the corrected back-projection coordinates in said step c) further includes segment back-projection coordinates which correspond to detector rows.

5. The method of improving image generation according to claim 1, wherein the corrected back-projection coordinates in said step c) further includes angular channel back-projection coordinates which correspond to detector columns.

6. The method of improving image generation according to claim 1 further comprising an additional step of reconstructing an image according to an exact reconstruction technique.

7. The method of improving image generation according to claim 6 wherein the projection data is obtained while the detectors are moved in a predetermined helical manner.

8. The method of improving image generation according to claim 1 wherein the projection data is obtained with a flying focal spot technique.

9. A CT scanner for improving image generation from projection data, comprising:
a gantry rotating around a predetermined axis;
a predetermined rows and columns of detectors mounted on said gantry for obtaining projection data with a known amount of readout time lag; and
an image processing unit for determining back-projection coordinates from the projection data, said image processing unit determining correction terms for the back-projection coordinates based upon the known readout time lag and known rotational parameters so that the correction terms are applied to the back-projection coordinates to generate output corrected back-projection coordinates, said image processing unit determining a pixel value based on the projection data with the corrected back-projection coordinates.

10. The CT scanner for improving image generation according to claim 9, wherein the back-projection coordinates further includes segment back-projection coordinates which correspond to detector rows and angular channel back-projection coordinates which correspond to detector columns.

11. The CT scanner for improving image generation according to claim 9, wherein the corrected back-projection coordinates further includes segment back-projection coordinates which correspond to detector rows and angular channel back-projection coordinates which correspond to detector columns.

12. The CT scanner for improving image generation according to claim 9 wherein said image processing unit further reconstructs an image according to an exact reconstruction technique.

13. The CT scanner for improving image generation according to claim 9 wherein said gantry moves said detectors in a predetermined helical manner.

14. The CT scanner for improving image generation according to claim 9 wherein the projection data is obtained with a flying focal spot technique.

* * * * *